(12) United States Patent
Yasuda

(10) Patent No.: US 11,323,630 B2
(45) Date of Patent: May 3, 2022

(54) IMAGE PROCESSING METHOD, IMAGE PROCESSOR, AND IMAGE CAPTURING DEVICE

(71) Applicant: SCREEN HOLDINGS CO., LTD., Kyoto (JP)

(72) Inventor: Takuya Yasuda, Kyoto (JP)

(73) Assignee: SCREEN HOLDINGS CO., LTD., Kyoto (JP)

( * ) Notice: Subject to any disclaimer, the term of this patent is extended or adjusted under 35 U.S.C. 154(b) by 503 days.

(21) Appl. No.: 16/319,678

(22) PCT Filed: May 30, 2017

(86) PCT No.: PCT/JP2017/020067
§ 371 (c)(1),
(2) Date: Jan. 22, 2019

(87) PCT Pub. No.: WO2018/042786
PCT Pub. Date: Mar. 8, 2018

(65) Prior Publication Data
US 2021/0195079 A1 Jun. 24, 2021

(30) Foreign Application Priority Data
Sep. 5, 2016 (JP) .............................. JP2016-172452

(51) Int. Cl.
*H04N 5/235* (2006.01)
*G06T 5/00* (2006.01)
(Continued)

(52) U.S. Cl.
CPC ........... *H04N 5/2351* (2013.01); *G06T 5/003* (2013.01); *H04N 5/2256* (2013.01);
(Continued)

(58) Field of Classification Search
CPC ......... H04N 5/232133; H04N 5/23229; H04N 5/23232; H04N 5/2356; H04N 5/35536;
(Continued)

(56) References Cited

U.S. PATENT DOCUMENTS

2008/0259176 A1 10/2008 Tamaru
2009/0310885 A1 12/2009 Tamaru
(Continued)

FOREIGN PATENT DOCUMENTS

CN 103348667 A 10/2013
CN 105516541 A 4/2016
(Continued)

OTHER PUBLICATIONS

Chinese Decision to Grant issued in corresponding Chinese Patent Application No. 201780054467.6, dated Nov. 2, 2020, with English translation.
(Continued)

*Primary Examiner* — Albert H Cutler
(74) *Attorney, Agent, or Firm* — McDermott Will & Emery LLP

(57) ABSTRACT

Definition is calculated for each pixel in a plurality of captured images while changing a focal position. For each coordinates, an image reference value indicating the number of a to-be-referenced captured image is determined. Then, a luminance value is calculated for each coordinates on the basis of the image reference value and the definition. At this time, the luminance value in the captured image indicated by the image reference value of peripheral coordinates is reflected in the luminance value in the captured image indicated by the image reference value of each coordinates. The calculated luminance values are combined to generate an omnifocal image. Accordingly, a smooth omnifocal image is generated. The image reference values themselves
(Continued)

are not changed. This prevents unnecessary luminance values of pixels existing in captured images that ought not to be referenced from appearing in the omnifocal image.

9 Claims, 10 Drawing Sheets

(51) Int. Cl.
    *H04N 5/225*     (2006.01)
    *H04N 5/232*     (2006.01)
    *G02B 21/36*     (2006.01)
    *G06T 5/50*     (2006.01)

(52) U.S. Cl.
    CPC ..... *H04N 5/23212* (2013.01); *H04N 5/23232* (2013.01); *H04N 5/232133* (2018.08)

(58) Field of Classification Search
    CPC .. H04N 5/35572; H04N 5/357; H04N 5/2351; H04N 5/2256; G06T 5/00; G06T 5/002; G06T 5/003
    See application file for complete search history.

(56) References Cited

U.S. PATENT DOCUMENTS

| | | |
|---|---|---|
| 2011/0090326 A1 | 4/2011 | Kenny et al. |
| 2013/0286259 A1 | 10/2013 | Tanaka |
| 2014/0192216 A1* | 7/2014 | Matsumoto ........ H04N 5/23219 348/222.1 |
| 2016/0191784 A1 | 6/2016 | Murayama et al. |
| 2017/0154413 A1* | 6/2017 | Yu ........................ G06K 9/6223 |

FOREIGN PATENT DOCUMENTS

| | | |
|---|---|---|
| JP | 2010-020758 A | 1/2010 |
| JP | 2013-228798 A | 11/2013 |
| JP | 2016-014974 A | 1/2016 |
| WO | 2012/125802 A1 | 9/2012 |
| WO | 2013/162747 A1 | 10/2013 |
| WO | 2015/020038 A1 | 2/2015 |

OTHER PUBLICATIONS

Gaussian blur—Wikipedia, Aug. 2, 2016, XP055660162, https://en.wikipedia.org/w/index.php?title=Gaussian_blur&oldid=732725171, retrieved on Jan. 21, 2020.

Extended European Search Report issued in corresponding European Patent Application No. 17845797.4-1208, dated Jan. 30, 2020.

Chinese Office Action issued in corresponding Chinese Patent Application No. 201780054467.6, dated Apr. 26, 2020, with English translation.

International Search Report issued in corresponding International Patent Application No. PCT/JP2017/020067, dated Aug. 8, 2017, with English Translation.

\* cited by examiner

Fig. 9

| 1 | 1 | 1 | 1 | 1 |
|---|---|---|---|---|
| 1 | 1 | 1 | 5 | 5 |
| 1 | 1 | 1 | 5 | 5 |
| 1 | 5 | 5 | 5 | 5 |
| 5 | 5 | 5 | 5 | 5 |

Fig. 10

| 10 | 20 | 3  | 1  | 3  |
|----|----|----|----|----|
| 30 | 50 | 30 | 4  | 4  |
| 7  | 30 | 10 | 10 | 4  |
| 1  | 4  | 15 | 90 | 35 |
| 1  | 2  | 4  | 40 | 25 |

IMAGE PROCESSING METHOD, IMAGE PROCESSOR, AND IMAGE CAPTURING DEVICE

CROSS REFERENCE

This application is the U.S. National Phase under 35 U.S.C. § 371 of International Application No. PCT/JP2017/020067, filed on May 30, 2017, which claims the benefits of Japanese Application No. 2016-172452, filed on Sep. 5, 2016, the entire contents of which are hereby incorporated by reference.

TECHNICAL FIELD

The present invention relates to an image processing method, an image processor, and an image capturing device for generating an omnifocal image on the basis of a plurality of captured images.

BACKGROUND ART

Patent Literature 1 discloses a device for observing culture conditions of biological cells by capturing images of the cells at high resolutions. The device according to Patent Literature 1 captures images of cells held along with a culture solution in a container with a camera. Such a device may in some cases has difficulty in focusing on all cells in the culture solution in one image capture. Thus, the device captures images a plurality of times while changing the focal position of the camera and combines a plurality of captured images to generate an omnifocal image that focuses on all the cells.

CITATION LIST

Patent Literature

Patent Literature 1: Japanese Patent Application Laid-Open No. 2016-14974
Patent Literature 2: Japanese Patent Application Laid-Open No. 2010-20758

SUMMARY OF INVENTION

Technical Problem

An omnifocal image is generated by joining in-focus portions of a plurality of captured images together. Thus, luminance values tend to become inconsistent at the joints of the images. In terms of this, Patent Literature 2 discloses a technique for generating a smooth omnifocal image by means of smoothing. The image processing apparatus according to Patent Literature 2 determines as a first reference value the number of an image to be referenced for each pixel among a plurality of captured images. The apparatus also calculates second reference values by smoothing the first reference values. On the basis of the second reference values, a smooth omnifocal image is generated.

With the method according to Patent Literature 2, however, images that intrinsically ought not to be referenced may in some cases be referenced on the basis of the second reference values obtained by smoothing, because the reference values themselves are smoothed. For example, at a spot where the first reference value changes from 1 to 5, the second reference value may change to 3 as a result of smoothing. At this time, if a foreign substance appears in a third image that intrinsically ought not to be referenced, that foreign substance also appears in a resultant omnifocal image.

The present invention has been made in view of such circumstances, and it is an object of the present invention to provide an image processing method, an image processor, and an image capturing device that can smoothly change luminance values at spots where image reference values change in an omnifocal image and that can also prevent unnecessary luminance values existing in captured images that ought not to be referenced from appearing in the omnifocal image.

Solution to Problem

In order to solve the above-described problems, a first invention of the present application is an image processing method for generating an omnifocal image on the basis of a plurality of captured images. The method includes the steps of a) acquiring a plurality of captured images by capturing an image of an object while changing a focal position along an optical axis, b) calculating definition for each pixel included in the plurality of captured images, c) determining an image reference value by comparing definition among corresponding pixels in the plurality of captured images, the image reference value indicating a number of one of the captured images that is to be referenced for a luminance value of each coordinates in an omnifocal image, d) calculating a luminance value for each coordinates on the basis of the image reference value and the definition, and e) generating an omnifocal image by combining the calculated luminance values. In the step d), a luminance value in a captured image indicated by the image reference value of the peripheral coordinates is reflected in a luminance value of each coordinates in a captured image indicated by the image reference value of the each coordinates.

A second invention of the present application is the image processing method according to the first invention, in which the step d) performs weighting that causes the peripheral coordinates to have more influence on the each coordinates as the definition of the peripheral coordinates increases, when the luminance value in the captured image indicated by the image reference values of the peripheral coordinates is reflected in the luminance value of the each coordinates in the captured image indicated by the image reference value of the each coordinates.

A third invention of the present application is an image processing method according to the first or second invention, in which the step d) performs weighting that causes the peripheral coordinates to have more influence on the each coordinates as the peripheral coordinates are closer in distance to the each coordinates, when the luminance value in the captured images indicated by the image reference value of the peripheral coordinates is reflected in the luminance value of the each coordinates in the captured image indicated by the image reference value of the each coordinates.

A fourth invention of the present application is an image processing method according to the second or third invention, in which the weighting uses a Gaussian function.

A fifth invention of the present application is an image processing method according to any one of the first to fourth inventions, in which the object is a cell.

A sixth invention of the present application is an image processor for generating an omnifocal image on the basis of a plurality of captured images. The image processor includes an image storage that stores a plurality of captured images acquired by capturing an image of an object while changing a focal position along an optical axis, a definition calculation part that calculates definition for each pixel included in the plurality of captured images, an image reference value determination part that determines an image reference value by comparing definition among corresponding pixels in the plurality of captured images, the image reference value indicating a number of one of the captured images that is to be referenced for a luminance value of each coordinates in an omnifocal image, a luminance value calculation part that calculates a luminance value for each coordinates on the basis of the image reference value and the definition, and an omnifocal image generator that generates an omnifocal image by combining the calculated luminance values. The luminance value calculation part reflects a luminance value in a captured image indicated by the image reference value of the peripheral coordinates in a luminance value of each coordinates in a captured image indicated by the image reference value of the each coordinates.

A seventh invention of the present application is the image processor according to the sixth invention, in which the luminance value calculation part performs weighting that causes the peripheral coordinates to have more influence on the each coordinates as the definition of the peripheral coordinates increases, when reflecting the luminance value in the captured image indicated by the image reference value of the peripheral coordinates in the luminance value of the each coordinates in the captured image indicated by the image reference value of the each coordinates.

An eighth invention of the present application is the image processor according to the sixth or seventh invention, in which the luminance value calculation part performs weighting that causes the peripheral coordinates to have more influence on the each coordinates as the peripheral coordinates are closer in distance to the each coordinates, when reflecting the luminance value in the captured image indicated by the image reference value of the peripheral coordinates in the luminance value of the each coordinates in the captured image indicated by the image reference value of the each coordinates.

A ninth invention of the present application is the image processor according to the seventh or eighth invention, in which the weighting uses a Gaussian function.

A tenth invention of the present application is the image processor according to any one of the sixth to ninth inventions, in which the object is a cell.

An eleventh invention of the present application is an image capturing device that includes the image processor according to any one of the sixth to tenth inventions, a camera that captures an image of the object, a projector that emits light toward the object, and a moving mechanism that changes a focal position of the camera along an optical axis.

Advantageous Effects of Invention

According to the first to fifth inventions of the present application, luminance values can change smoothly at spots where the image reference values change in the omnifocal image. In particular, the present invention enables calculating the luminance value of each coordinates such that the luminance values change smoothly, without changing the image reference value determined in the step c). This prevents unnecessary luminance values of pixels existing in captured images that ought not to be referenced from appearing in the omnifocal image.

In particular, according to the fourth invention of the present application, the degree of weighting can be adjusted by arbitrarily setting coefficients of Gaussian functions.

According to the sixth to eleventh inventions of the present application, luminance values can change smoothly at spots where the image reference values change in the omnifocal image. In particular, the present invention enables calculating the luminance value of each coordinates such that the luminance values change smoothly, without changing the image reference value determined by the image reference value determination part. This prevents unnecessary luminance values of pixels existing in captured images that ought not to be referenced from appearing in the omnifocal image.

In particular, according to the ninth invention of the present application, the degree of weighting can be adjusted by arbitrarily setting coefficients of Gaussian functions.

BRIEF DESCRIPTION OF DRAWINGS

FIG. 9 illustrates an example of the distribution of image reference values;

FIG. 10 illustrates an example of the distribution of definition; and

DESCRIPTION OF EMBODIMENTS

Preferred embodiments of the present invention will be described hereinafter with reference to the drawings.

1. Configuration of Image Capturing Device

Figure 1:
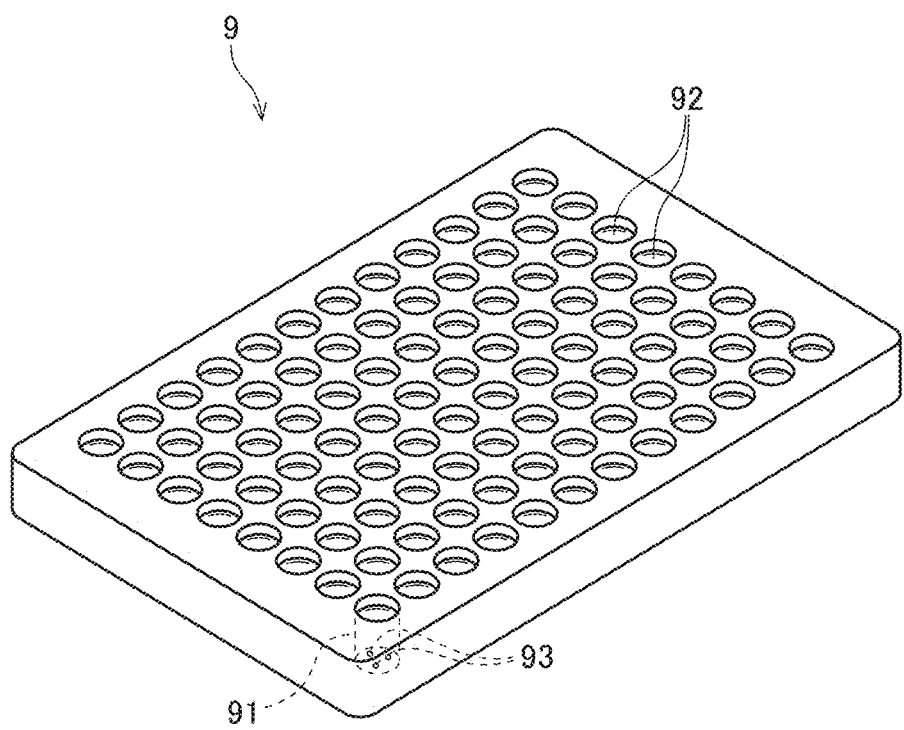
FIG. 1 is a perspective view illustrating an example of a well plate.

FIG. 1 is a perspective view illustrating an example of a well plate 9 that is set in an image capturing device 1. The well plate 9 is a generally plate-like specimen container having a plurality of wells (depressions) 91. The material for the well plate 9 is, for example, a transparent resin that transmits light. As illustrated in FIG. 1, the plurality of wells 91 is arranged regularly in the upper surface of the well plate 9. Each well 91 holds therein a plurality of biological cells 93 targeted for image capture, along with a culture solution 92. Note that the shape of the wells 91 when viewed from above may be circular as in FIG. 1 or may be other shapes such as rectangles.

Figure 2:
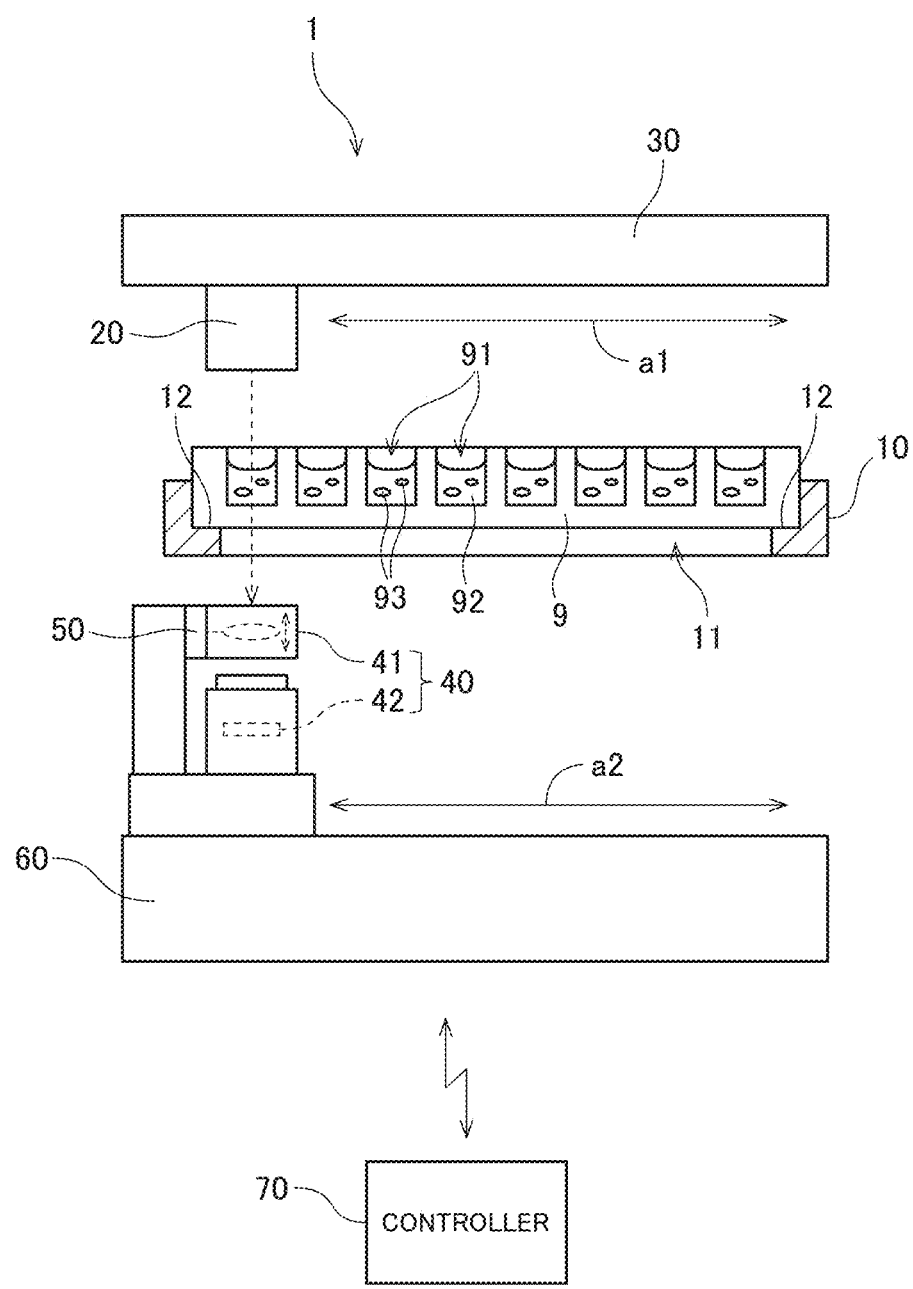
FIG. 2 illustrates a configuration of an image capturing device.

FIG. 2 illustrates a configuration of the image capturing device 1 according to an embodiment of the invention. This image capturing device 1 is a device that captures images of the plurality of cells 93 in the well plate 9 a plurality of times while changing the focal position of a camera 40 and combines a plurality of resultant captured images to generate a composite image (omnifocal image) for observation.

The image capturing device 1 is used in, for example, a screening process of narrowing down chemical compounds serving as candidates for pharmaceuticals in the field of research and development of pharmaceuticals. In the screening process, a person in charge adds chemical compounds of different concentrations or compositions to the plurality of wells 91 of the well plate 9. Then, the image capturing device 1 is used to capture images of cells 93 in each well 91 of the well plate 9. The culture conditions of the cells 93 are thereafter compared and analyzed on the basis of the obtained images to inspect the effects of the chemical compounds added to the culture solution 92.

Alternatively, the image capturing device 1 may be used in research and development of pluripotent stem cells such as iPS cells or ES cells to observe cell differentiation, for example.

As illustrated in FIG. 2, the image capturing device 1 according to the present embodiment includes a stage 10, a projector 20, a projector moving mechanism 30, the camera 40, a focal point moving mechanism 50, a camera moving mechanism 60, and a controller 70.

The stage 10 is a pedestal that holds the well plate 9. The position of the stage 10 in the image capturing device 1 is fixed during at least image capture. The stage 10 has a rectangular opening 11 penetrating in the up-down direction in the center. The stage 10 also has a ring-shaped supporting surface 12 at the edge of the opening 11. The well plate 9 is fitted in the opening 11 and supported in a horizontal position by the supporting surface 12. The top and bottom of each well 91 are thus exposed without being blocked off by the stage 10.

The projector 20 is disposed above the well plate 9 held on the stage 10. The projector 20 has a light source such as LEDs. The light source of the projector 20 emits light during image capture, which will be described later. Thus, the projector 20 applies light downward. Note that the projector 20 needs only apply light toward the well plate 9. Therefore, the light source itself of the projector 20 may be disposed at a position off the top of the well plate 9 and configured to apply light to the well plate 9 via an optical system such as a mirror.

The projector moving mechanism 30 is a mechanism for moving the projector 20 horizontally along the upper surface of the well plate 9 held on the stage 10. For example, a mechanism for converting rotational motion of a motor into rectilinear motion through a ball screw is used as the projector moving mechanism 30. The image capturing device 1 can dispose the projector 20 at a position above each well 91 by operating the projector moving mechanism 30. Although only one direction indicated by arrow a1 is illustrated in FIG. 2 as the direction of movement of the projector 20, the projector moving mechanism 30 may be configured to move the projector 20 in two directions (left-right direction and depth direction in FIG. 2) along the upper surface of the well plate 9.

The camera 40 is disposed below the well plate 9 held on the stage 10. The camera 40 includes an optical system 41 such as a lens and an image sensor 42 such as a CCD or a CMOS. In the case of capturing an image as described later, the camera 40 captures an image of part of the well plate 9 while the projector 20 applies light toward that part of the well plate 9. Accordingly, an image of cells 93 in the well plate 9 is acquired in the form of digital data. The captured image is input from the camera 40 to the controller 70.

The focal point moving mechanism 50 is a mechanism for changing the focal position of the camera 40. The focal point moving mechanism 50 according to the present embodiment moves some optics included in the optical system 41 of the camera 40. Thereby, the focal position of the camera 40 is changed along the optical axis. The focal point moving mechanism 50 is cable of changing the focal position of the camera 40 minutely in the up-down direction in the vicinity of the cells 93 in the well plate 9. For example, a compact motor is used as the focal point moving mechanism 50.

The camera moving mechanism 60 is a mechanism for changing the horizontal position of the camera 40 while maintaining the posture of the camera 40. The camera moving mechanism 60 moves the camera 40 and the focal point moving mechanism 50 horizontally as an integral unit. For example, a mechanism for converting rotational motion of a motor into rectilinear motion through a ball screw is used as the camera moving mechanism 60. The image capturing device 1 can dispose the camera 40 at a position under each well 91 by operating the camera moving mechanism 60. Although only one direction indicated by arrow a2 is illustrated in FIG. 2 as the direction of movement of the camera 40 by the camera moving mechanism 60, the camera moving mechanism 60 may be configured to move the camera 40 in two directions (left-right direction and depth direction in FIG. 2) along the lower surface of the well plate 9.

The projector moving mechanism 30 and the camera moving mechanism 50 described above are driven in synchronization. Accordingly, the projector 20 and the camera 40 are always disposed at the same position when viewed from above. That is, the projector 20 and the camera 40 move the same distance in the same direction, and when the camera 40 is disposed at a position under a given cell 93, the projector 20 is always disposed at a position above that cell 93.

Figure 3:
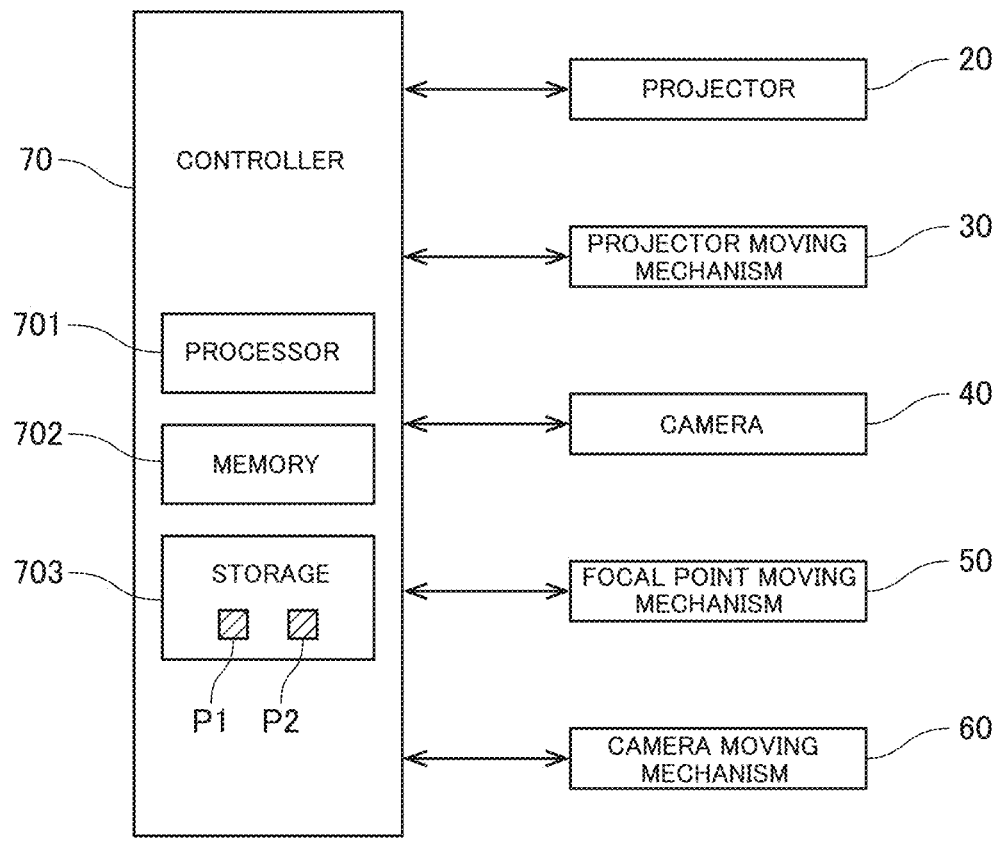
FIG. 3 is a block diagram illustrating connection between a controller and each part of the image capturing device.

The controller 70 is configured by, for example, a computer. The controller 70 has a function serving as a control device for controlling the operation of each part of the image capturing device 1 and a function serving as an image processor for generating an omnifocal image on the basis of a plurality of captured images input from the camera 40. FIG. 3 is a block diagram illustrating connection between the controller 70 and each part of the image capturing device 1. As illustrated in FIG. 3, the controller 70 is communicably connected to each of the projector 20, the projector moving mechanism 30, the camera 40, the focal point moving mechanism 50, and the camera moving mechanism 60 described above.

As schematically illustrated in FIG. 2, the controller 70 includes a processor 701 such as a CPU, a memory 702 such as a RAM, and a storage 703 such as a hard disk drive. The storage 703 stores a control program P1 for controlling the operation of each part of the image capturing device 1, and an image processing program P2 for generating an omnifocal image on the basis of a plurality of captured images input from the camera 40.

Figure 4:
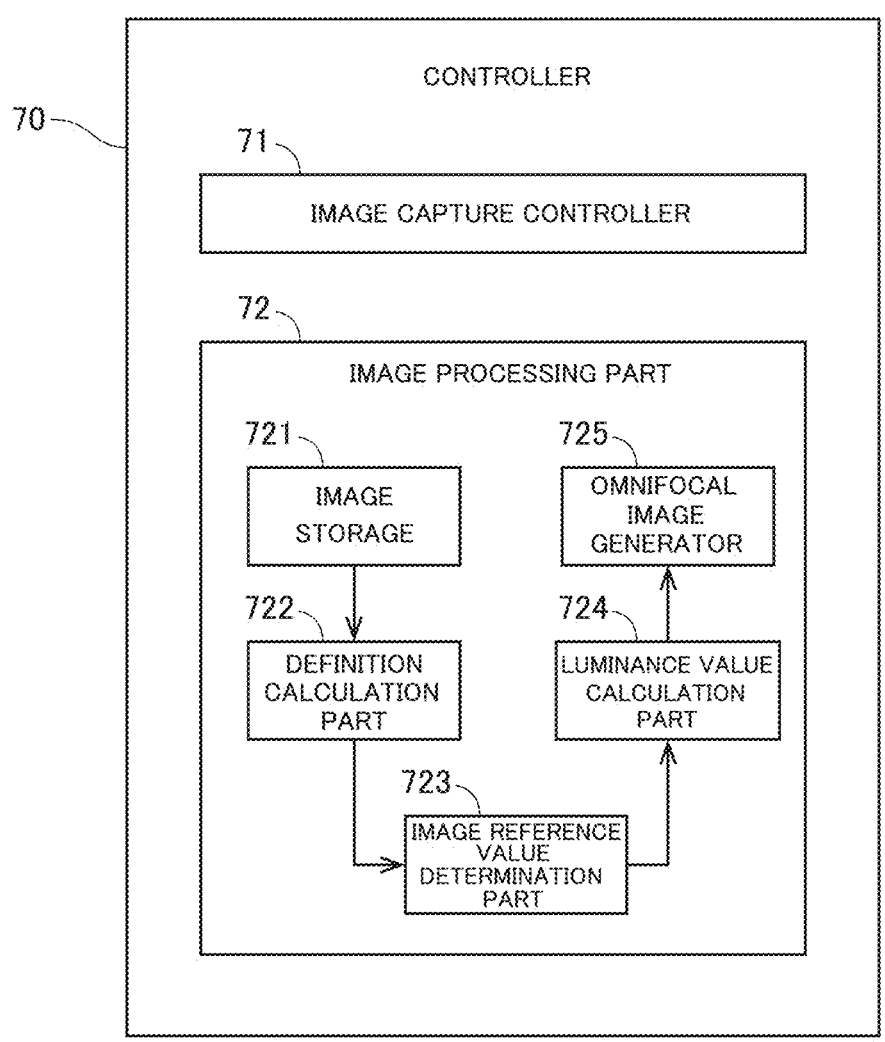
FIG. 4 is a block diagram schematically illustrating functions implemented within the controller.

FIG. 4 is a block diagram schematically illustrating the functions implemented within the controller 70. As illustrated in FIG. 4, the controller 70 includes an image capture controller 71 and an image processing part 72. The image capture controller 71 controls the operations of the projector 20, the projector moving mechanism 30, the camera 40, the focal point moving mechanism 50, and the camera moving mechanism 60 in accordance with the control program P1, thereby causing the processing for capturing images of cells 93 held in each well 91 of the well plate 9 to proceed. The image processing part 72 generates an omnifocal image by processing a plurality of captured images input from the camera 40 in accordance with the image processing program P2.

The image processing part 72 includes an image storage 721, a definition calculation part 722, an image reference value determination part 723, a luminance value calculation part 724, and an omnifocal image generator 725 as illustrated in FIG. 4. Specific processing performed by these parts will be described later.

2. Image Capturing Process

Figure 5:
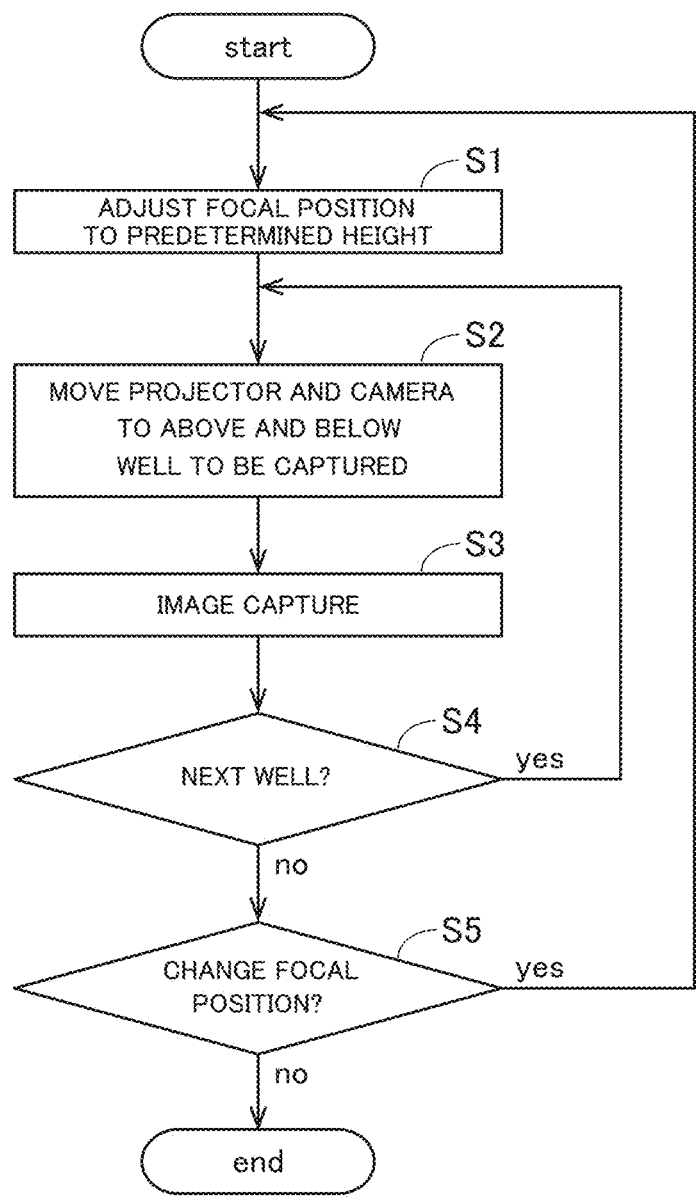
FIG. 5 is a flowchart illustrating a flow of an image capturing process.

Next, the operations of the aforementioned image capturing device 1 will be described. FIG. 5 is a flowchart illustrating a flow of the image capturing process performed by the image capturing device 1.

Figure 6:
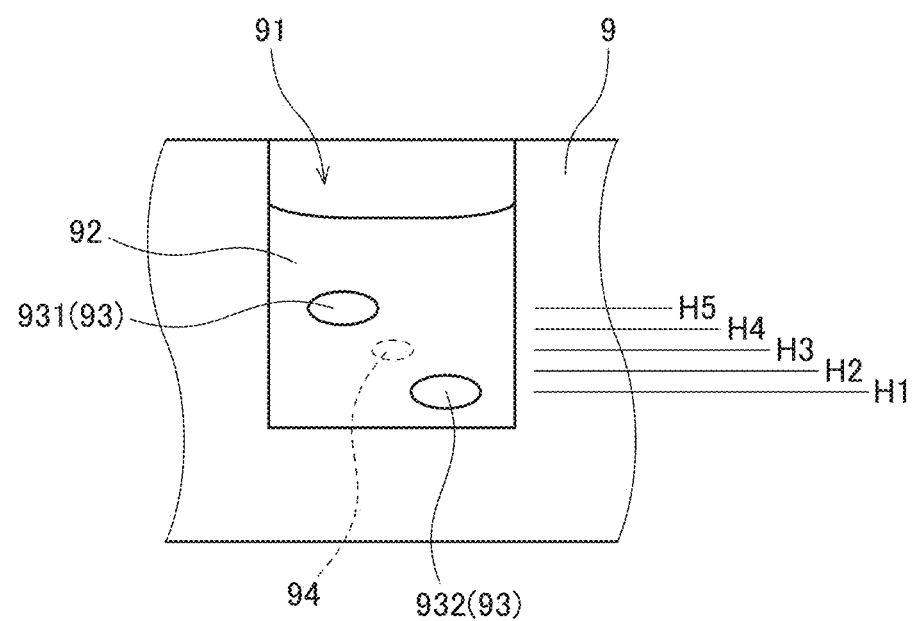
FIG. 6 is a cross-sectional view of one well.

When the well plate 9 has been set on the stage 10 of the image capturing device 1 and an instruction to start operation has been input to the controller 70, the image capture controller 71 of the controller 70 first operates the focal point moving mechanism 50. Thereby, the focal position of the camera 40 is adjusted to a predetermined height (step S1). FIG. 6 is a cross-sectional view of one well 91. According to the present embodiment, the focal position of camera 40 can be changed in five stages (from a first focal position H1 to a fifth focal position H5) as illustrated in FIG. 6. At the start of the image capturing process, the focal point of the camera 40 is first adjusted to the highest first focal position H1.

Then, the controller 70 operates the projector moving mechanism 30 and the camera moving mechanism 60. Thereby, the projector 20 and the camera 40 are respectively moved to above and under a well 91 targeted for image capture (step S2). Then, the controller 70 captures an image of cells 93 held in that well 91 by operating the projector 20 and the camera 40 (step S3). That is, the camera 40 captures an image while the projector 20 applies light downward. Accordingly, an image of the cells 93 held in that well 91 is captured at the first focal position H1.

Then, the controller 70 determines whether or not there is the next well 91 targeted for image capture (step S4). If there is the next well 91 (yes in step S4), the controller 70 operates the projector moving mechanism 30 and the camera moving mechanism 60. Thereby, the projector 20 and the camera 40 are respectively moved to above and under the next well 91 (step S2). Then, the controller 70 captures an image of cells 93 held in that well 91 by operating the projector 20 and the camera 40 (step S3).

In this way, the controller 70 repeats the movement of the projector 20 and the camera 40 (step S2) and the image capture (step S3). Accordingly, images of all the wells 91 targeted for image capture in the well plate 9 are captured at the first focal position H1.

If there remains no wells 91 for which image capture has not yet been performed (no in step S4), the controller 70 determines whether or not to change the focal position of the camera 40 (step S5). Here, if there remains a focal position at which image capture has not yet been performed among the five focal positions H1 to H5, the controller 70 determines to change the focal position of the camera 40 (yes in step S5). For example, when the image capturing process at the first focal position H1 has ended, the controller 70 determines to change the focal position of the camera 40 to the next focal position, i.e., the second focal position H2.

In the case of changing the focal position of the camera 40, the controller 70 operates the focal point moving mechanism 50 to move the focal position of the camera 40 to a position to which the focal position of the camera 40 ought to be changed (step S1). Then, the aforementioned processing in steps S2 to S4 is repeated. Accordingly, an image of cells 93 in each well 91 of the well plate 9 is captured at the changed focal position.

As described above, the controller 70 repeats the change in the focal position of the camera 40 (step S1) and the acquisition of captured images for the plurality of wells 91 (steps S2 to S4). Accordingly, five images are captured at the five focal positions H1 to H5 for each of the plurality of wells 91 of the well plate 9.

3. Image Processing

The next description gives image processing for generating an omnifocal image on the basis of a plurality of captured images input from the camera 40.

Figure 7:
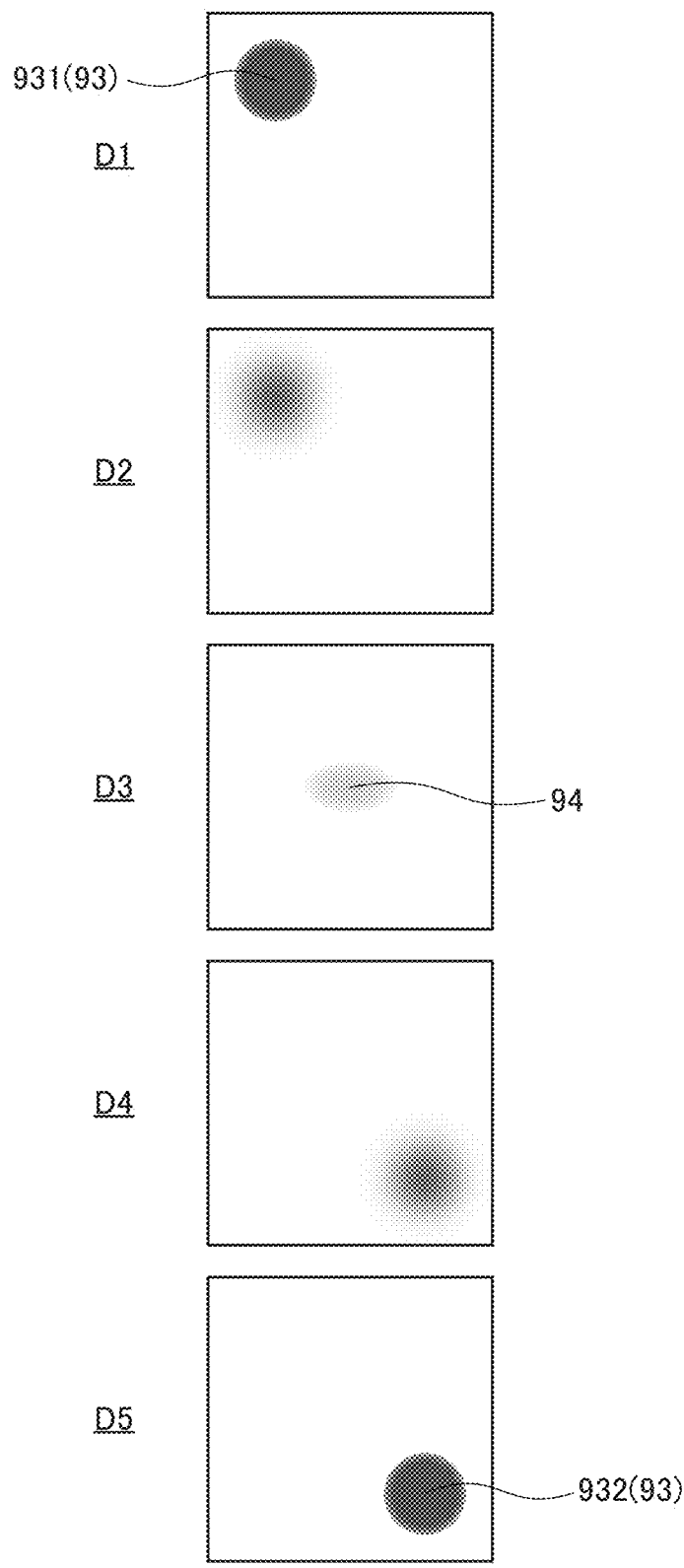
FIG. 7 illustrates five captured images acquired for one well.

FIG. 7 illustrates five captured images D1 to D5 acquired for the well 91 in FIG. 6. The first to fifth captured images D1 to D5 in FIG. 7 are images captured respectively at the first to fifth focal positions H1 to H5 in FIG. 6. As illustrated in FIG. 6, two cells 93 and one foreign substance 94 are assumed to exist in the field of image capture of the camera 40 within the well 91 according to the present embodiment. Hereinafter, the cell 93 on the left side in FIG. 6 is referred to as a first cell 931, and the cell 93 on the right side as a second cell 932. In the example in FIG. 7, the first cell 931 is most sharply in focus in the first captured image D1, and the second cell 932 is most sharply in focus in the fifth captured image D5. The foreign substance 94 appears in the third captured image D3.

The observation of the cells 93 is preferably conducted at an in-focus position where the cells are in focus. However, in the case where a plurality of cells 93 included in one well 91 are at different heights (different positions in the direction of the optical axis) as illustrated in FIG. 6, it is not possible to focus on all the cells 93 in one captured image D. Thus, the controller 70 of the image capturing device 1 combines pixels included in the plurality of captured images D1 to D5 to generate an omnifocal image that focuses on all the cells 93 and has less blurring.

Figure 8:
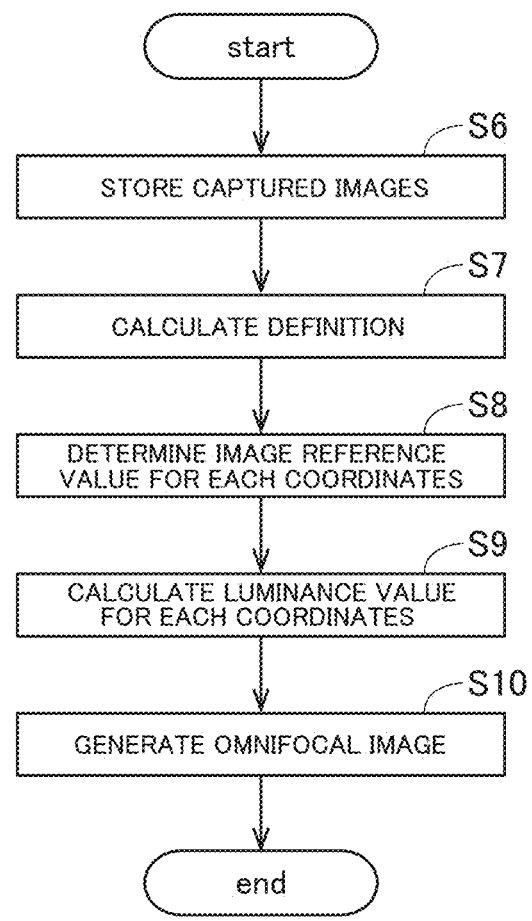
FIG. 8 is a flowchart illustrating a procedure for generating an omnifocal image.

FIG. 8 is a flowchart illustrating a procedure for generating an omnifocal image, performed by the controller 70.

In the case of generating an omnifocal image, the controller 70 first stores the plurality of captured images D1 to D5 obtained by the aforementioned image capturing process in the image storage 721 (step S6). Next, the definition calculation part 722 of the controller 70 calculates definition S for each pixel in each of the plurality of captured images D1 to D5 (step S7). The definition S is an index indicating the sharpness of the image in the vicinity of that pixel. The definition S is, for example, calculated on the basis of a change in luminance among pixels in a certain region centered on that pixel. Alternatively, other values such as the value of dispersion of luminance among peripheral pixels, a maximum luminance value, a minimum luminance value, or the luminance value of that pixel itself may be used as the definition S.

When the definition S has been calculated for each pixel in each captured image D, next the image reference value determination part 723 of the controller 70 compares the definition S among corresponding pixels in the plurality of captured images D1 to D6. Thereby, an image reference value A is determined for each coordinates (step S8). The image reference value A is a parameter that indicates the number of a captured image D to be referenced for the luminance value of each coordinates in the omnifocal image. For example, the image reference value A is set to 1 when a pixel having a highest definition S among corresponding pixels (of the same coordinates) in the plurality of captured images D1 to D5 belongs to the captured image D1.

FIG. 9 illustrates an example of the distribution of image reference values A determined on the basis of the five captured images D1 to D5 in FIG. 7. In order to facilitate understanding, the number of pixels that constitute an image is assumed to be 5×5 pixels, i.e., 25 pixels. In the example in FIG. 7, the captured image that focuses most sharply on the first cell 931 located in the upper left of the center of the image is the first captured image D1. Thus, pixels included in the first captured image D1 have high definition S in the upper left region of the image. Accordingly, image reference values A in the upper left region of the image are set to 1 as illustrated in FIG. 9. In the example in FIG. 7, the captured image that focuses most sharply on the second cell 932 located in the lower right of the center of the image is the fifth captured image D5. Thus, pixels included in the fifth captured image D5 have high definition S in the lower right region of the image. Accordingly, image reference values A in the lower right region of the image are set to 5 as illustrated in FIG. 9.

When the image reference value A has been determined for each coordinates, then the controller 70 determines definition S that represents each coordinates. FIG. 10 illustrates an example of the distribution of the definition S that represents each coordinates. As the definition S representing each coordinates, for example, definition S in the captured image D indicated by the image reference value A of that coordinates is employed. For example, for coordinates having an image reference value A of 1 as in the upper left region in FIG. 9, the definition S of that coordinates in the first captured image D1 is determined as definition S representing that coordinates. For coordinates having an image reference value A of 5 as in the lower right region in FIG. 9, the definition S of that coordinate in the fifth captured image D5 is determined as definition S representing that coordinates.

Thereafter, the luminance value calculation part 724 of the controller 70 calculates a luminance value V of each coordinates that constitute an omnifocal image, on the basis of the image reference value A determined in step S8 and the luminance values in the captured images D1 to D5 (step S9). In step S9, the luminance values in captured images D indicated by the image reference values A of the peripheral coordinates are reflected in the luminance value of each coordinates in a captured image D indicated by the image reference value A of that coordinates, in order to calculate the luminance value V of each coordinates in the omnifocal image. Specifically, the luminance value calculation part 724 calculates the luminance value V of each coordinates constituting an omnifocal image by, for example, using Expression (1) below:

image indicated by the image reference value A(xn+k, yn+1).

Expression (1) expresses the amount of weighting applied to the distance and the amount of weighting applied to the definition S by Gaussian coefficients, and means multiplying those amounts. That is, the luminance value calculation part 724 reflects the luminance values of peripheral coordinates in the luminance value of the coordinates of interest by weighting corresponding to the distance and the definition S, so as to calculate the luminance value V of each coordinates in the omnifocal image. To describe this in more detail, the luminance value calculation part 724 first references the luminance value of each coordinates in the captured image D indicated by the image reference value A illustrated in FIG. 9. The luminance value calculation part 724 then reflects the luminance values in the captured images D indicated by the image reference values A of the peripheral coordinates in the luminance value of the coordinates of interest. At this time, the luminance value calculation part 724 causes the peripheral coordinates to have more influence on the coordinates of interest as the peripheral coordinates are closer in distance to the coordinates of interest. The luminance value calculation part 724 also causes the peripheral coordinates to have more influence on the coordinates of interest as the definition S in FIG. 10 of the peripheral coordinates increases.

Figure 11:
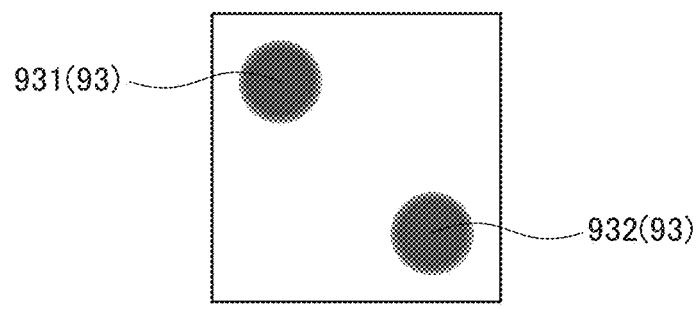
FIG. 11 illustrates an example of the omnifocal image.

Thereafter, the omnifocal image generator 725 of the controller 70 combines the luminance values V calculated for each coordinates to generate an omnifocal image (step S10). FIG. 11 illustrates an example of the omnifocal image generated on the basis of the five captured images D1 to D5 in FIG. 7. In the omnifocal image, the foreign substance 94 does not appear, and both the first cell 931 and the second cell 932 appear with less blurring.

In this way, in this image capturing device 1, the luminance values in the captured images D indicated by the image reference values A of the peripheral coordinates are reflected in the luminance value of each coordinates in the captured image D indicated by the image reference value A of that coordinates. Accordingly, luminance values can change smoothly at spots where the image reference values A change in the omnifocal image. This image capturing device 1 also enables calculating the luminance value of $$V(xn, yn) = \frac{\sum_{k=-fx}^{fx} \sum_{l=-fy}^{fy} I(A(xn+k, yn+l), xn, yn) \exp\left(-\frac{k^2+l^2}{2\sigma_d^2}\right) \exp\left(-\frac{(1-S(xn+k, yn+l))^2}{2\sigma_s^2}\right)}{\sum_{k=-fx}^{fx} \sum_{l=-fy}^{fy} \exp\left(-\frac{k^2+l^2}{2\sigma_d^2}\right) \exp\left(-\frac{(1-S(xn+k, yn+l))^2}{2\sigma_s^2}\right)}$$

Expression (1)

In Expression (1), V(xn, yn) indicates the luminance value of coordinates (xn, yn) in the omnifocal image (luminance value to be calculated); k and l respectively indicate x- and y-direction distances from the coordinates of interest (xn, yn) to the peripheral coordinates; fx and fy indicate the ranges of coordinates that are taken into consideration from the coordinates of interest (ranges of luminance values to be reflected); σd indicates the weighting coefficient of distance; and σs indicates the weighting coefficient of definition S. The definition S(x, y) is assumed to be standardized to a value from 0 to 1. Also, I(A(xn+k, yn+l), xn, yn) indicates the luminance value of coordinates (xn, yn) in the captured each coordinates such that the luminance values change smoothly, without changing the image reference values themselves determined in step S8. This prevents unnecessary luminance values of pixels existing in captured images D that ought not to be referenced (e.g., luminance values for the foreign substance 94 included in the third captured image D3) from appearing in the omnifocal image.

The present embodiment also uses Gaussian functions when weighting the distance and the definition S as in Expression (1). Thus, the degree of weighting can easily be adjusted by arbitrarily setting coefficients of the Gaussian functions.

4. Variations

While embodiments of the invention have been described thus far, the present invention is not intended to be limited to the above-described embodiments.

Expression (1) above is one example of the equation for calculating the luminance value in the omnifocal image. Instead of Expression (1), other equations may be used. The equation needs only to be an equation for reflecting the luminance values in the captured images D indicated by the image reference values A of the peripheral coordinates in the luminance value of each coordinates in the captured image D indicated by the image reference value A of that coordinates.

The above-described embodiments have described a case where one field of view is set for one well 91 and in this field of view, image capture is performed while changing the focal position. Alternatively, one well 91 may be divided into a plurality of fields of view, and a plurality of captured images D may be acquired for each field of view while moving the camera 40 between each field of view. In that case, an omnifocal image may be generated for each field of view by the above-described image processing, and the obtained omnifocal images may be combined (tiled) to generate an image of one well 91.

According to the above-described embodiments, the cells 93 targeted for image capture are held in the plurality of wells 91 of the well plate 9. Alternatively, the cells 93 may be held in a container other than the well plate 9. For example, the cells 93 may be held in a petri dish.

According to the above-described embodiments, the cells 93 that are simple substances are used as objects targeted for image capture. Alternatively, the objects targeted for image capture may be cell agglomerations (spheroids) that are three-dimensional aggregates of a plurality of cells. As another alterative, the objects targeted for image capture may be test specimens other than cells.

According to the above-described embodiments, the projector 20 is disposed above objects targeted for image capture, and the camera 40 is disposed below the objects targeted for image capture. Alternatively, the projector 20 may be disposed below the objects targeted for image capture, and the camera 40 may be disposed above the objects targeted for image capture.

According to the above-described embodiments, the focal position of the camera 40 is changed by moving some optics included in the optical system 41 of the camera 40. Alternatively, the entire camera 40 may be moved up and down to change the focal position of the camera 40 within the well 91 along the optical axis. The focal position of the camera 40 relative to the container may be changed by moving up and down the container that holds the objects targeted for image capture. That is, the "moving mechanism" according to the present invention may be either a mechanism for moving the entire camera 40 or a mechanism for moving the container.

According to the above-described embodiments, the position of the container holding the cells 93 is fixed, and the projector 20 and the camera 40 are moved in the horizontal direction. Alternatively, the positions of the projector 20 and the camera 40 may be fixed, and the container may be moved in the horizontal direction. However, if the cells 93 in the culture solution 92 change during image capture, the positions of the cells 93 tend to shift among a plurality of captured images D. Therefore, it is preferable for the position of the container to be fixed as in the above-described embodiments.

According to the above-described embodiments, the focal position of the camera 40 can be changed in five stages, and five captured images D1 to D5 are acquired for each field of view. Alternatively, the number of images D to be captured for each field of view may be in the range of two to four, or may be six or more.

Each element in the above-described embodiments and variations may be combined appropriately within a range that presents no contradictions.

REFERENCE SIGNS LIST

1 Image capturing device
9 Well plate
10 Stage
20 Projector
30 Projector moving mechanism
40 Camera
41 Optical system
42 Image sensor
50 Focal point moving mechanism
60 Camera moving mechanism
70 Controller
71 Image capture controller
72 Image processing part
91 Well
92 Culture solution
93 Cell
94 Foreign substance
721 Image storage
722 Definition calculation part
723 Image reference value determination part
724 Luminance value calculation part
725 Omnifocal image generator
A Image reference value
D1 to D5 Captured image
H1 to H5 Focal position
P1 Control program
P2 Image processing program
S Definition

The invention claimed is:

1. An image processing method for generating an omnifocal image based on a plurality of captured images, the method comprising the steps of:
   a) acquiring a plurality of captured images by capturing an image of an object while changing a focal position along an optical axis;
   b) calculating definition for each pixel included in said plurality of captured images;
   c) determining an image reference value by comparing definition among corresponding pixels in said plurality of captured images, the image reference value indicating a number of one of said captured images that is to be referenced for a luminance value of each coordinates in an omnifocal image;
   d) calculating a luminance value for each coordinates based on said image reference value and said definition without changing the image reference value determined in the step c); and
   e) generating an omnifocal image by combining the calculated luminance values,
   wherein in said step d), a luminance value in a captured image indicated by the image reference value of peripheral coordinates is reflected in a luminance value of each coordinates in a captured image indicated by the image reference value of each coordinates, and wherein said step d) performs weighting that causes the peripheral coordinates to have more influence on each coordinates as said definition of the peripheral coordinates increases, when the luminance value in the captured image indicated by the image reference values of the peripheral coordinates is reflected in the luminance value of each coordinates in the captured image indicated by the image reference value of each coordinates.

2. The image processing method according to claim 1, wherein
said step d) performs weighting that causes the peripheral coordinates to have more influence on each coordinates as the peripheral coordinates are closer in distance to each coordinates, when the luminance value in the captured images indicated by the image reference value of the peripheral coordinates is reflected in the luminance value of each coordinates in the captured image indicated by the image reference value of each coordinates.

3. The image processing method according to claim 1, wherein
said weighting uses a Gaussian function.

4. The image processing method according to claim 1, wherein
said object is a cell.

5. An image processor for generating an omnifocal image based on a plurality of captured images, comprising a computer including a processor, a memory, and a storage storing an image processing program, said computer, when the processor executes the said image processing program, being configured to perform as:
an image storage that stores a plurality of captured images acquired by capturing an image of an object while changing a focal position along an optical axis;
a definition calculation part that calculates definition for each pixel included in said plurality of captured images;
an image reference value determination part that determines an image reference value by comparing definition among corresponding pixels in said plurality of captured images, the image reference value indicating a number of one of said captured images that is to be referenced for a luminance value of each coordinates in an omnifocal image;

a luminance value calculation part that calculates a luminance value for each coordinates based said image reference value and said definition without changing the image reference value determined by the image reference value determination part; and
an omnifocal image generator that generates an omnifocal image by combining the calculated luminance values,
wherein said luminance value calculation part reflects a luminance value in a captured image indicated by the image reference value of peripheral coordinates in a luminance value of each coordinates in a captured image indicated by the image reference value of the each coordinates, and
wherein said luminance value calculation part performs weighting that causes the peripheral coordinates to have more influence on each coordinates as said definition of the peripheral coordinates increases, when reflecting the luminance value in the captured image indicated by the image reference value in the luminance value of each coordinates in the captured image indicated by the image reference value of each coordinates.

6. The image processor according to claim 5, wherein
said luminance value calculation part performs weighting that causes the peripheral coordinates to have more influence on each coordinates as the peripheral coordinates are closer in distance to each coordinates, when reflecting the luminance value in the captured image indicated by the image reference value of the peripheral coordinates in the luminance value of each coordinates in the captured image indicated by the image reference value of each coordinates.

7. The image processor according to claim 5, wherein
said weighting uses a Gaussian function.

8. The image processor according to claim 5, wherein
said object is a cell.

9. An image capturing device comprising:
the image processor according to claim 5;
a camera that captures an image of said object;
a projector that emits light toward said object; and
a moving mechanism that changes a focal position of said camera along an optical axis.

* * * * *